US012717707B2

(12) United States Patent
Muthiah et al.

(10) Patent No.: US 12,717,707 B2
(45) Date of Patent: Aug. 25, 2026

(54) METHOD AND SYSTEM FOR GENERATING REAL-TIME TEST ENVIRONMENT ACTIVITY VIEW FOR FUNCTIONAL SIMULATIONS

(71) Applicant: HCL America Inc., Sunnyvale, CA (US)

(72) Inventors: Manickam Muthiah, Shrewsbury, MA (US); Selvin Isaac Pandian, Ambattur (IN); Razi Abdul Rahim, Willowbrook, IL (US)

(73) Assignee: HCL America Inc.

( * ) Notice: Subject to any disclaimer, the term of this patent is extended or adjusted under 35 U.S.C. 154(b) by 153 days.

(21) Appl. No.: 17/848,572

(22) Filed: Jun. 24, 2022

(65) Prior Publication Data

US 2023/0418728 A1 Dec. 28, 2023

(51) Int. Cl.
*G06F 11/3698* (2025.01)
*G06F 11/3668* (2025.01)

(52) U.S. Cl.
CPC ...... *G06F 11/3698* (2025.01); *G06F 11/3684* (2013.01); *G06F 11/3688* (2013.01); *G06F 11/3692* (2013.01)

(58) Field of Classification Search
CPC ............. G06F 11/3664; G06F 11/3684; G06F 11/3688; G06F 11/3692
See application file for complete search history.

(56) References Cited

U.S. PATENT DOCUMENTS 6,530,054 B2 3/2003 Hollander
8,397,188 B1 3/2013 Scheidt
8,515,015 B2 8/2013 Maffre et al.
(Continued)

FOREIGN PATENT DOCUMENTS

IN 309354 B 3/2019

OTHER PUBLICATIONS

T. Strasser; Real-Time Simulation Technologies for Power Systems Design Testing and Analysis; IEEE; pp. 63-73; retrieved on Feb. 20, 2026 (Year: 2015).*
Wei Li; An Equivalent Circuit Method for Modelling and Simulation of Modular Multilevel Converters in Real-Time HIL Test Bench; IEEE; pp. 2401-2409; retrieved on Feb. 20, 2026 (Year: 2016).*
(Continued)

*Primary Examiner* — S. Sough
*Assistant Examiner* — Cuong V Luu
(74) *Attorney, Agent, or Firm* — Kendal M. Sheets

(57) ABSTRACT

A method for generating a real-time test environment activity view for a functional simulation is described. In some embodiments, the method includes retrieving a unique identifier (ID) associated with each of a plurality of testbench components present in a test environment from a real-time test environment activity viewer log file. The method further includes iteratively fetching from the real-time test environment activity viewer log file, a set of information corresponding to an activity associated with each of the plurality of testbench components based on the associated unique ID. The method further includes contemporaneously generating at each iteration, a real-time test environment activity view for each of the plurality of testbench components based on the associated set of information. The method further includes contemporaneously rendering at each iteration, the real-time test environment activity view for each of the plurality of testbench components via a Graphical User Interface (GUI).

14 Claims, 8 Drawing Sheets

(56) References Cited

U.S. PATENT DOCUMENTS

| | | | | |
|---|---|---|---|---|
| 11,200,129 | B2 | 12/2021 | Carrington et al. | |
| 2001/0044782 | A1* | 11/2001 | Hughes | G06F 21/121 |
| 2011/0175750 | A1* | 7/2011 | Anderson | H02J 3/00<br>340/870.16 |
| 2011/0238397 | A1* | 9/2011 | Chen | G06F 11/3672<br>703/13 |
| 2014/0019923 | A1* | 1/2014 | Agarwala | G06F 30/33<br>716/104 |
| 2018/0048532 | A1* | 2/2018 | Poort | H04L 67/10 |
| 2019/0087075 | A1* | 3/2019 | Dhayanithi | G06F 30/20 |

OTHER PUBLICATIONS

Pre-Silicon Test Pattern Validation, Debug, and Re-target Solution, Jan. 13, 2017,Design Solution, Product, Solution,Feb. 1, 1983,Tokyo, Japan.

* cited by examiner

METHOD AND SYSTEM FOR GENERATING REAL-TIME TEST ENVIRONMENT ACTIVITY VIEW FOR FUNCTIONAL SIMULATIONS

TECHNICAL FIELD

Generally, the invention relates to pre-silicon functional simulation. More specifically, the invention relates to method and system for generating a real-time test environment activity view for a functional simulation.

BACKGROUND

Simulation is a process of execution of a model, represented by a computer program that provides information about a device or a system under investigation. As opposed to an analytical approach for analyzing the model that is purely theoretical, the analysis of the model via the simulation technique is more reliable as it is more flexible and convenient. In order to analyze the system via the simulation technique, multiple simulation testbench components are used.

In a scenario, where a functional simulation of a Device Under Test (or System Under Test (SUT)) present in a test environment (also called as testbench, verification environment etc.) with testbench components (for example, drivers, monitors, scoreboards) is in progress or complete, understanding the entire activity of each testbench component present in the test environment is time consuming. Moreover, in such scenario, when the functional simulation is a long running simulation, then the amount of log files' information that needs to be reviewed might be huge. The log files information is reviewed to understand functionality of different testbench components present in the test environment during the functional simulation. Currently, there is no standard mechanism available to represent activity information of each testbench component present in the test environment and access associated log files information to get understanding of functionality of each testbench component during progress of the functional simulation or after completion of the functional simulation. There is considerable amount of training needed to be able to review the log files to understand testbench components' activity for someone who is not familiar with the test environment used.

Therefore, there is a need of implementing an efficient and reliable technique for generating a real-time test environment activity view for a functional simulation.

SUMMARY OF INVENTION

In one embodiment, a method for generating a real-time test environment activity view for a functional simulation is disclosed. The method may include retrieving a unique identifier (ID) associated with each of a plurality of testbench components present in a test environment. It should be noted that, the unique ID associated with each of the plurality of testbench components is transmitted by corresponding testbench component and prestored in a real-time test environment activity viewer log file stored in a simulation logs database. The method may include iteratively fetching from the real-time test environment activity viewer log file, a set of information corresponding to an activity associated with each of the plurality of testbench components based on the associated unique ID retrieved from the real-time test environment activity viewer log file stored in the simulation logs database. The method may include contemporaneously generating at each iteration, a real-time test environment activity view for each of the plurality of testbench components based on the associated set of information. It should be noted that, the real-time test environment activity view corresponds to progress or status of the functional simulation. The method may include contemporaneously rendering at each iteration, the real-time test environment activity view for each of the plurality of testbench components via a Graphical User Interface (GUI).

In another embodiment, a system for generating a real-time test environment activity view for a functional simulation is disclosed. The system includes a processor and a memory communicatively coupled to the processor. The memory may store processor-executable instructions, which, on execution, may cause the processor to retrieve a unique identifier (ID) associated with each of a plurality of testbench components present in a test environment. It should be noted that, the unique ID associated with each of the plurality of testbench components is transmitted by corresponding testbench component and prestored in a real-time test environment activity viewer log file stored in a simulation logs database. The processor-executable instructions, on execution, may further cause the processor to iteratively fetch from the real-time test environment activity viewer log file, a set of information corresponding to an activity associated with each of the plurality of testbench components based on the associated unique ID retrieved from the real-time test environment activity viewer log file stored in the simulation logs database. The processor-executable instructions, on execution, may further cause the processor to contemporaneously generate at each iteration, a real-time test environment activity view for each of the plurality of testbench components based on the associated set of information. It should be noted that, the real-time test environment activity view corresponds to progress or status of the functional simulation. The processor-executable instructions, on execution, may further cause the processor to contemporaneously render at each iteration, the real-time test environment activity view for each of the plurality of testbench components via a Graphical User Interface (GUI).

In yet another embodiment, a graphical user interface (GUI) client for rendering a real-time test environment activity view for a functional simulation is disclosed. The disclosed GUI client may be configured to receive a request from a user to render the real-time test environment activity view for the functional simulation. It should be noted that, the real-time test environment activity view may include a plurality of testbench components present in a test environment and a set of information corresponding to an activity associated with each of the plurality of testbench components. The GUI client may be configured to process the received request for generating the real-time test environment activity view. The GUI client may be configured to contemporaneously render at each iteration, to the user, the real-time test environment activity view generated for each of the plurality of testbench components based on the associated set of information.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
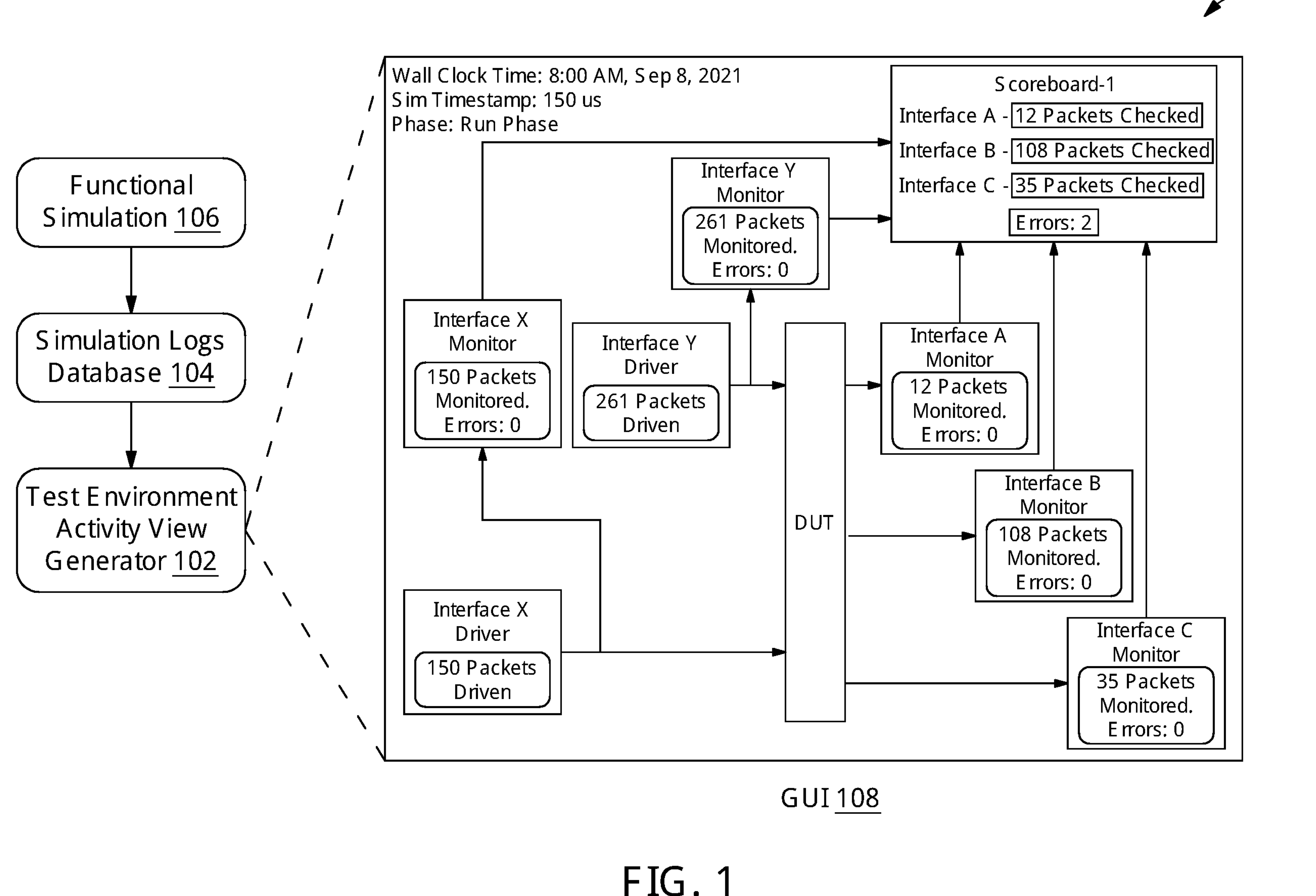
FIG. 1 illustrates a functional diagram of a system configured for generating a real-time test environment activity view for a functional simulation, in accordance with an embodiment.

A functional diagram of a system 100 configured for generating a real-time test environment activity view for a functional simulation 106 is illustrated in FIG. 1, in accordance with an embodiment. In order to generate the real-time test environment activity view, the system 100 may include a real-time test environment activity view generator 102. In an embodiment, the real-time test environment activity view generator 102 may correspond to a tool that is configured to show a plurality of testbench components present in a test environment along with a set of information corresponding to an activity associated with each of the plurality of testbench components in form of a block diagram, referred as, the real-time test environment activity view. In an embodiment, the plurality of testbench components may include, but is not limited to, an agent, sequencer, a driver, a monitor, a scoreboard, a checker, and a coverage collector.

In order to generate the real-time test environment activity view, the real-time test environment activity view generator 102 may be configured to retrieve a unique identifier (ID) associated with each of the plurality of testbench components present in the test environment. In an embodiment, the unique ID may be defined based on a function of each of the plurality of testbench components. Further, the unique ID associated with each of the plurality of testbench components may be transmitted by a corresponding testbench component from the plurality of testbench components. Moreover, the unique ID transmitted by the corresponding testbench component may be prestored in a real-time test environment activity viewer log file stored in a simulation logs database 104.

Once the unique ID is retrieved, the real-time test environment activity view generator 102 may iteratively fetch a set of information corresponding to an activity associated with each of the plurality of testbench components from the real-time test environment activity viewer log file. The set of information may be fetched based on the associated unique ID retrieved from the real-time test environment activity viewer log file. In an embodiment, the set of information may include, but is not limited to, a plurality of packets processed by each of the plurality of testbench components, an error message flagged by one or more of the plurality of testbench components, a status information of each of the plurality of testbench components, and a connectional flow between each of the plurality of testbench components.

In other words, initially, each of the plurality of testbench components may need to print the associated unique ID into the real-time test environment activity viewer log file during start of the functional simulation. Once the unique ID is printed, each of the plurality of testbench components may need to periodically print number of packets processed and number of error message flagged by one or more of the plurality of testbench components in the real-time test environment activity viewer log file during the progress of the functional simulation. By way of an example, when a testbench component is a monitor, then the monitor may need to print whether it is a Device Under Test (DUT) input monitor or a DUT output monitor. By way of another example, when a testbench component is a scoreboard, then the scoreboard may need to print name of the monitor from which it may have received each of the plurality of packets.

Once the unique ID associated with each of the plurality of testbench components is printed, the real-time test environment activity view generator 102 may retrieve the unique ID associated with each of the plurality of testbench components from the real-time test environment activity viewer log file stored in the simulation logs database 104. Based on the retrieved unique ID, the real-time test environment activity view generator 102 may fetch the set of information associated with each of the plurality of testbench components. In other words, the real-time test environment activity view generator 102 may fetch data printed (i.e., the unique ID and the set of information) into the real-time test environment activity viewer log file during the functional simulation. In an embodiment, the data may be printed by each of the plurality of testbench components present in the test environment periodically to dynamically generate the real-time test environment activity view.

Upon fetching the set of information, the real-time test environment activity view generator 102 may contemporaneously generate the real-time test environment activity view for each of the plurality of testbench components at each iteration, based on the associated set of information. In an embodiment, the real-time test environment activity view may correspond to progress or status of the functional simulation. Further, the real-time test environment activity view generator 102 may contemporaneously render the real-time test environment activity view generated for each of the plurality of testbench components at each iteration, via a Graphical User Interface (GUI) 108. In other words, the real-time test environment activity view may be a GUI based view as depicted via the GUI 108 (also referred as a GUI client) in the present FIG. 1. In an embodiment, the GUI 108 may be a user interface of an electronic device of a user. Examples of the electronic device may include, but is not limited to, laptop, tablet, desktop, and smartphone. A method of generating and rendering the real-time test environment activity view on the GUI 108 is further explained in detail in conjunction with FIG. 3. Moreover, an elaborated view of the real-time test environment activity view rendered via the GUI 108 is depicted and explained in detail in conjunction with FIG. 6-FIG. 11.

Figure 2:
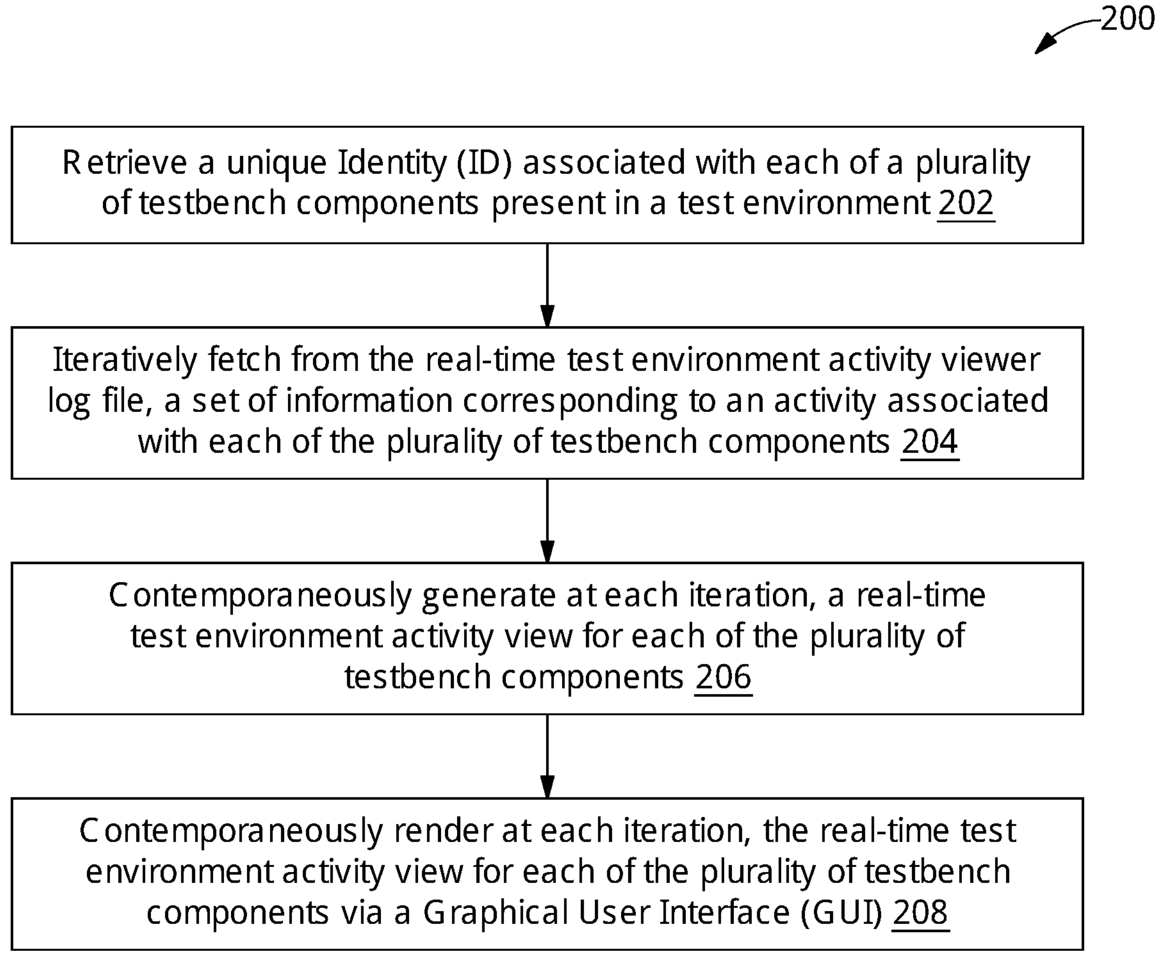
FIG. 2 illustrates a flowchart of a method for generating a real-time test environment activity view for a functional simulation, in accordance with an embodiment.

Referring now to FIG. 2, a flowchart of a method 200 for generating a real-time test environment activity view for a functional simulation is illustrated, in accordance with an embodiment. At step 202, a unique identifier (ID) associated with each of a plurality of testbench components may be retrieved. In an embodiment, each of the plurality of testbench components may be present in a test environment. The plurality of testbench components may include, but is not limited to an agent, sequencer, a driver, a monitor, a scoreboard, a checker, and a coverage collector. Further, the unique ID associated with each of the plurality of testbench components may be transmitted by corresponding testbench component. The transmitted unique ID may be prestored in a real-time test environment activity viewer log file stored in a simulation logs database. In reference to FIG. 1, the simulation logs database may correspond to simulation logs database 104.

In an embodiment, the unique ID associated with each of the plurality of testbench components may be defined based on a function of each of the plurality of testbench components. Further, in order to define the unique ID, consistency in defining the unique ID may be considered as an important aspect. By way of an example, the unique ID for two testbench components, e.g., a driver and a monitor connected to an 'Interface X' may be defined as 'Interface X Driver' and 'Interface X Monitor' respectively. This is done to ensure names of the two testbench components remain consistent. Examples of the unique ID associated with each of the plurality of testbench components may include 'Interface X Driver', 'Interface C Monitor', 'Interface X Monitor', etc.

Upon retrieving the unique ID, at step 204, a set of information may be iteratively fetched corresponding to an activity associated with each of the plurality of testbench components. Moreover, the set of information may be fetched based on the associated unique ID retrieved from the real-time test environment activity viewer log file stored in the simulation logs database. In an embodiment, the set of information may include, but is not limited to, a plurality of packets processed by each of the plurality of testbench components, an error message flagged by one or more of the plurality of testbench components, a status information of each of the plurality of testbench components, and a connectional flow between each of the plurality of testbench components.

Once the set of information is fetched, at step 206, a real-time test environment activity view for each of the plurality of testbench components may be contemporaneously generated at each iteration. In an embodiment, the real-time test environment activity view may be generated based on the associated set of information. In an embodiment, the real-time test environment activity view may correspond to progress or status of the functional simulation. Further, at step 208, the real-time test environment activity view for each of the plurality of testbench components may be contemporaneously rendered at each iteration via a GUI.

As will be appreciated, the real-time test environment activity view may be a dynamic view during the run phase of the functional simulation and may be updated based on the progress of the functional simulation. On the other hand, the real-time test environment activity view may be the cumulative real-time test environment activity view after the functional simulation gets completed. In other words, the real-time test environment activity view generated for the functional simulation may not change once the functional simulation is complete. In addition, the real-time test environment activity view generated after completion of the functional simulation may reflect a cumulative activity of each of the plurality of testbench components present in the test environment at the end of the functional simulation. A method of generating and rendering the real-time test environment activity view is further explained in detail in reference to FIG. 3.

Figure 3:
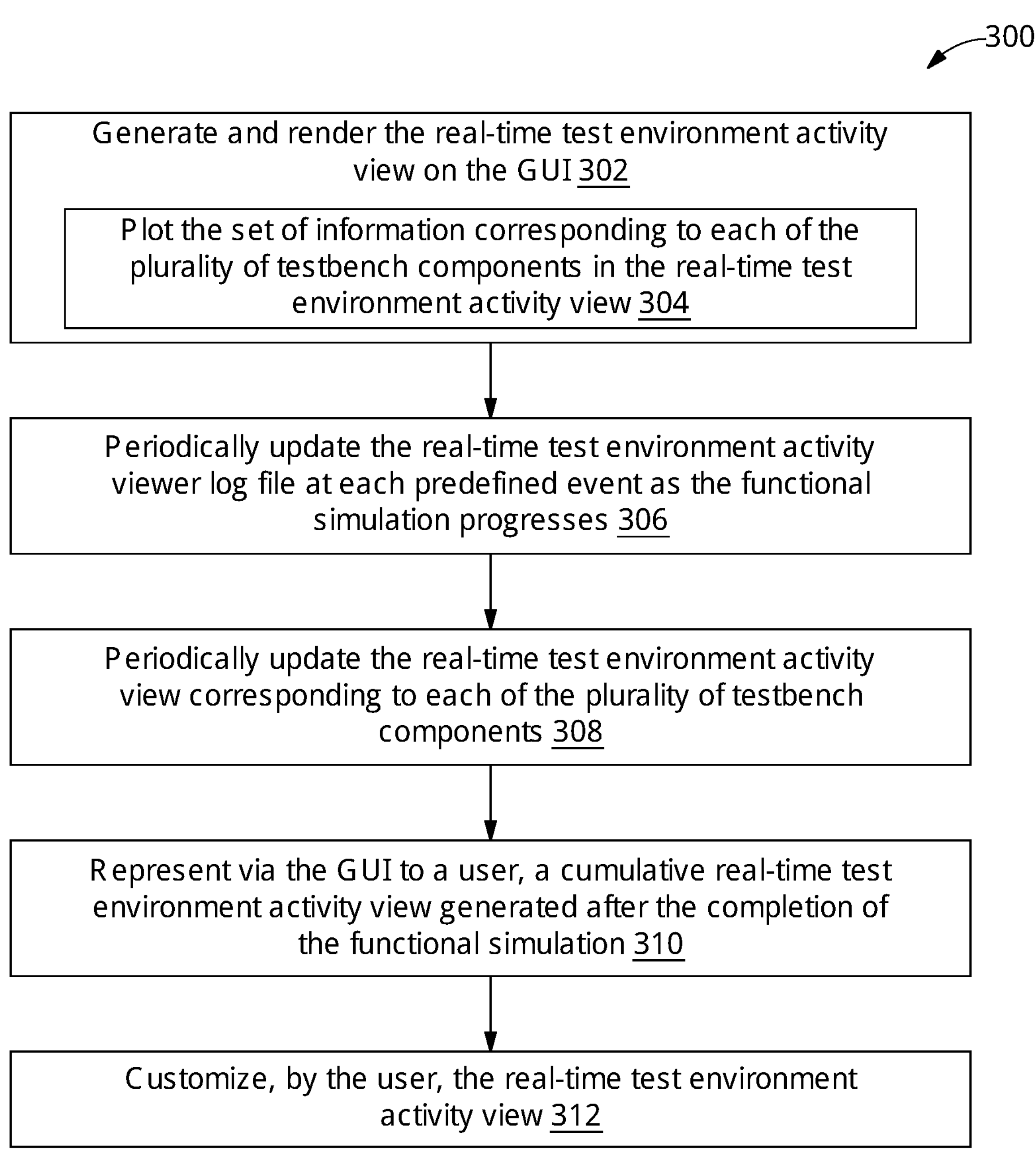
FIG. 3 illustrates a flowchart of a method for generating and rendering a real-time test activity view via a GUI, in accordance with an embodiment.

Referring now to FIG. 3, a flowchart of a method 300 for generating and rendering a real-time test environment activity view via a GUI is illustrated, in accordance with an embodiment. In order to generate and render the real-time test environment activity view on the GUI at step 302, 304-312 are executed. The step 302 is already discussed as step 206 and step 208 in FIG. 2. To further elaborate, upon receiving the set of information associated with each of the plurality of testbench components, the set of information corresponding to each of the plurality of testbench components may be plotted in the real-time test environment activity view at step 306. The set of information may include, but is not limited to, the plurality of packets processed by each of the plurality of testbench components, the error message flagged by one or more of the plurality of testbench components, the status information of each of the plurality of testbench components, and the connectional flow between each of the plurality of testbench components. Examples of the status information associated with each of the plurality of testbench components may include, but is not limited to, idle, busy, waiting for credits, and driver not able to send packets. It should be noted that, the set of information corresponding to each of the plurality of testbench components may be plotted based on the activity associated with each of the plurality of testbench components.

Further, at step 306, the real-time test environment activity viewer log file may be periodically updated based on progress of the functional simulation at each predefined event. The updates in the real-time test environment activity viewer log file may be done based on updates in the set of information of each of the plurality of testbench components. The set of information may be updated based on the activity performed by each of the plurality of testbench components. By way of an example, the predefined event may correspond to printing of every packet processed by the each of the plurality of testbench components in the real-time test environment activity viewer log file. By way of another example, the predefined event for performing the updates in the real-time test environment activity viewer log file may correspond to the error message flagged by the one or more of the plurality of testbench components.

Further, based on the updates in the real-time test environment activity viewer log file as explained in step 306, at step 308, the real-time test environment activity view may be periodically updated corresponding to each of the plurality of testbench components present in the test environment. Moreover, after completion of the functional simulation, at step 310, a cumulative real-time test environment activity view generated for the functional simulation may be represented to the user via the GUI.

Further, at step 312, the user may customize the real-time test environment activity view. In order to customize the real-time test environment activity view, the user may select an appropriate predefined view configuration based on requirement of the user. In other words, the user may customize the real-time test environment activity view based on what the user wants to see in the real-time test environment activity view. For example, in system on chip (SoC) test environment, the user might not be interested in seeing all testbench components present in the SoC test environment. If the user is interested in viewing the activity corresponding to a specific set of testbench components (i.e., monitor associated with a node in the SoC), then the user may generate the real-time test environment activity view by selecting the appropriate predefined view configuration.

Figure 4:
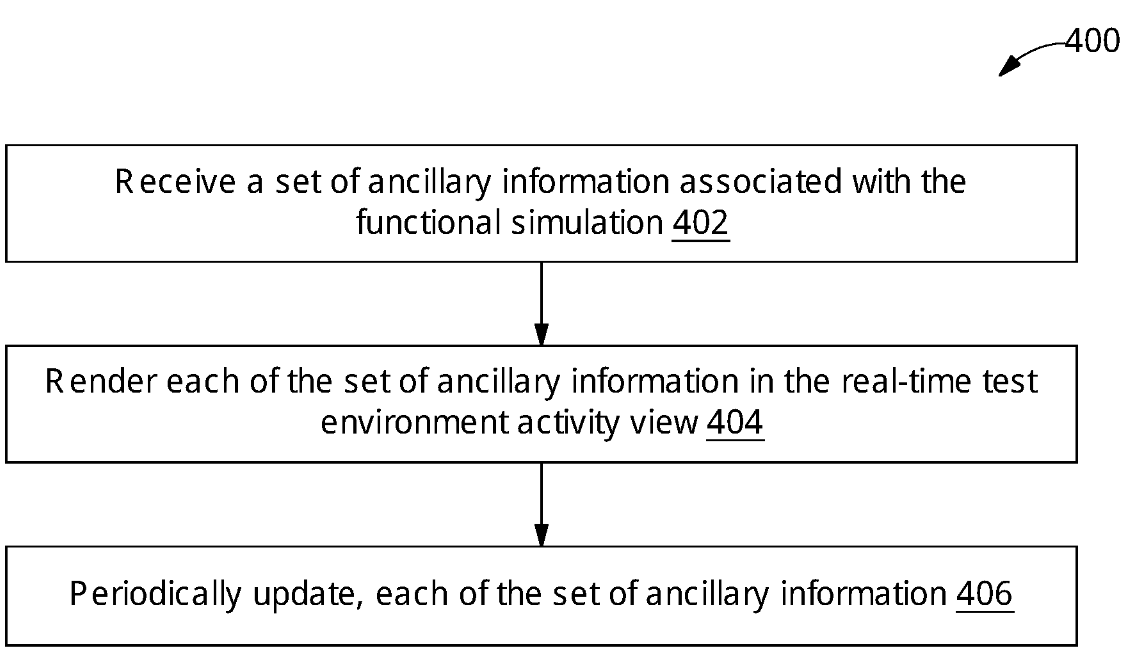
FIG. 4 illustrates a flowchart of a method for updating a set of ancillary information in a real-time test environment activity view, in accordance with an embodiment.

Referring now to FIG. 4, a flowchart of a method 400 for updating a set of ancillary information in a real-time test environment activity view is illustrated, in accordance with an embodiment. In addition to the set of information associated with each of the plurality of testbench components, at step 402, a set of ancillary information associated with the functional simulation may also be received. In an embodiment, the set of ancillary information may include, but is not limited to, a wall clock time, a date, a functional simulation timestamp, and a phase of the functional simulation. In an embodiment, the phase of the functional simulation is one of a verification methodology phases. The verification methodology phases may include, but is not limited to, the phases of Verification Methodology Manual (VMM), Open Verification Methodology (OVM), and Universal Verification Methodology (UVM).

Upon receiving the set of ancillary information, at step 404, each of the set of ancillary information may be rendered in the real-time test environment activity view, to the user. In other words, the real-time test environment activity view may render the wall clock time, the date, the functional simulation timestamp corresponding to the set of information presented in the real-time test environment activity view, and the phase of the functional simulation (for example: a run phase). It should be noted that, when the functional simulation is complete, then the functional simulation timestamp may correspond to an end of the simulation. Further, at step 406, each of the set of ancillary information may be periodically updated based on progress of the functional simulation. The set of ancillary information rendered in the real-time test environment activity view has been depicted via FIG. 6 and FIG. 7.

Figure 5:
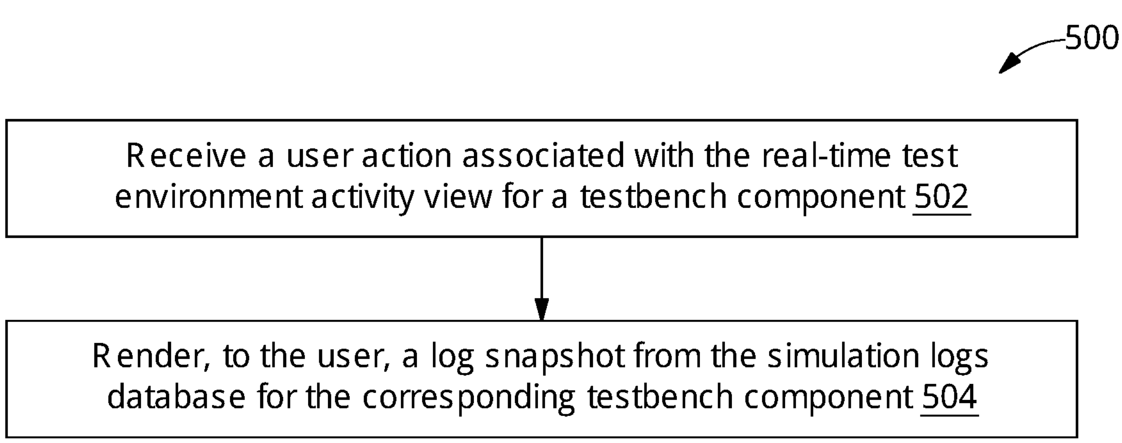
FIG. 5 illustrates a flowchart of a method for receiving a user action associated with a real-time test environment activity view, in accordance with an embodiment.

Referring now to FIG. 5, a flowchart of a method 500 for receiving a user action associated with a real-time test environment activity view is illustrated, in accordance with an embodiment. At step 502, a user action may be received. The received user action may be associated with the real-time test environment activity view for a testbench component from the plurality of testbench components. In reference to FIG. 1, the real-time test environment activity view may correspond to the real-time test environment activity view rendered via the GUI 108.

Upon receiving the user action, at step 504, a log snapshot may be rendered from the simulation logs database. In an embodiment, the log snapshot may include information of each of the plurality of packets processed by the corresponding testbench component and information associated with any error message flagged by the testbench component. By way of an example, the user action may correspond to a selection of a testbench component from the plurality of testbench components. The selection of the testbench component may be done by the user by clicking (e.g., a mouse click) on a specific text within a box of the respective testbench component rendered in the real-time test environment activity view. An elaborated view of the log snapshot is depicted and explained in detail in conjunction with FIG. 10 and FIG. 11.

Figure 6:
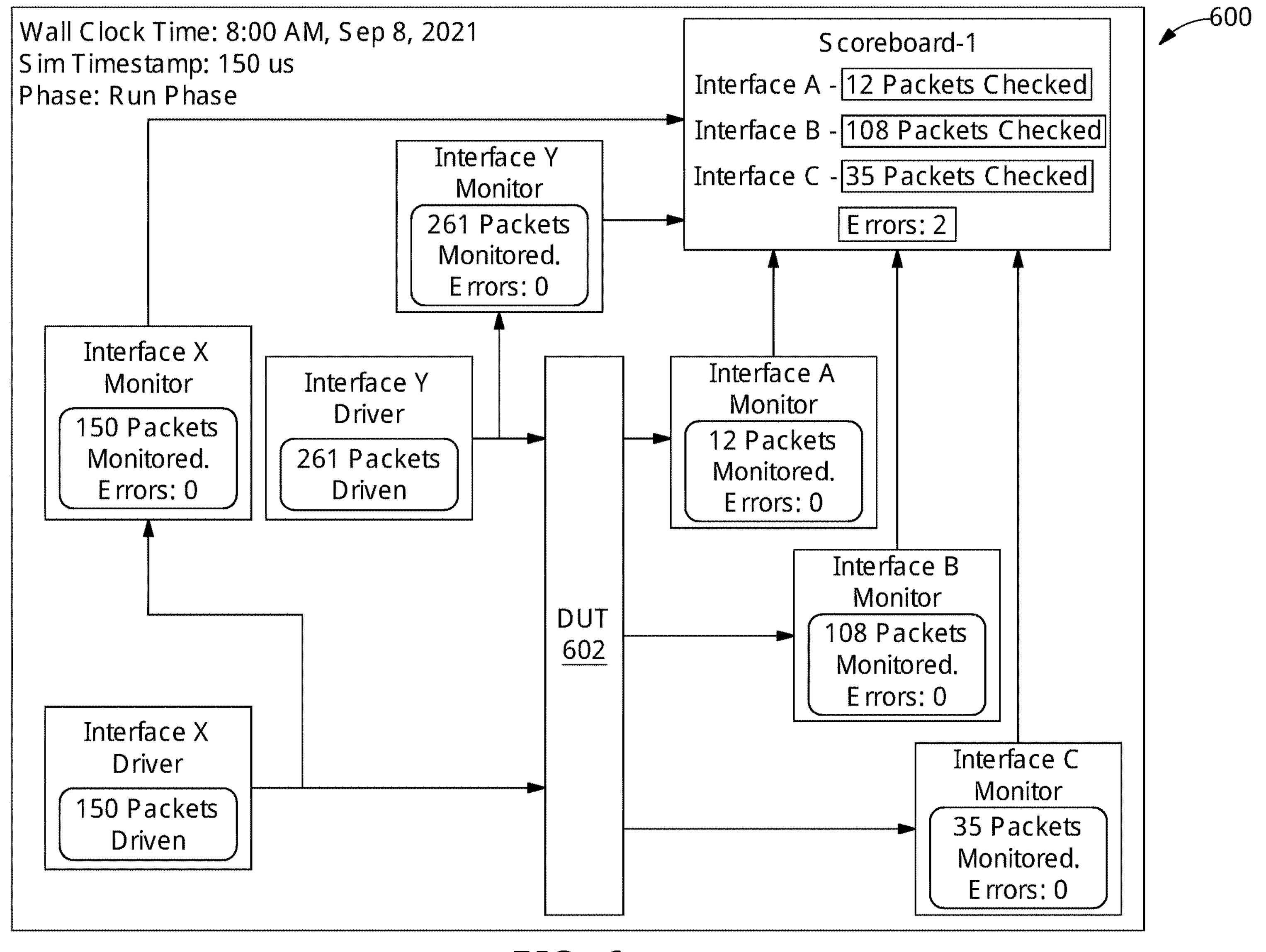
FIG. 6 represents a real-time test environment activity view generated on a GUI based on a set of information corresponding to an activity associated with a plurality of testbench components, in accordance with an exemplary embodiment.

Referring now to FIG. 6, a real-time test environment activity view generated on a GUI 600 based on a set of information corresponding to an activity associated with a plurality of testbench components is represented, in accordance with an exemplary embodiment. In reference to FIG. 1, the real-time test environment activity view generated on the GUI 600 may correspond to the real-time test environment activity view rendered via the GUI 108. Based on processing performed by the real-time test environment activity view generator 102, the real-time test environment activity view may be generated for the functional stimulation. As depicted via the GUI 600, each of the plurality of testbench components present in the test environment may be rendered using the unique ID assigned to each of the plurality of testbench components. In the GUI 600, each of the plurality of testbench components present in the test environment may be rendered using the assigned unique ID, depicted as 'Interface X Monitor', 'Interface X Driver', 'Interface Y Monitor', 'Interface Y Driver', 'scoreboard-1', 'Interface A Monitor', 'Interface B Monitor', and 'Interface C Monitor'. Further, in addition to the plurality of testbench components, the real-time test environment activity view may include a Device Under Test (DUT) 602 as depicted via the GUI 600. Further, the real-time test environment activity view generated for each of the plurality of testbench components may provide representation of the set of information associated with each of the plurality of testbench components. As already explained, the set of information may be retrieved using the assigned unique ID retrieved from the real-time test environment activity viewer log file. In an embodiment, the set of information may include, but is not limited to, the plurality of packets processed by each of the plurality of testbench components, the error message flagged by one or more of the plurality of testbench components, the status information of each of the plurality of testbench components, and the connectional flow between each of the plurality of testbench components. As depicted via the GUI 600, each of the plurality of testbench components along with the associated set of information may be represented in a block.

By way of an example, for the 'Interface X Monitor' testbench component, the plurality of packets processed by the 'Interface X Monitor' may be depicted as '150 packets monitored'. Further, the error message flagged by the 'Interface X Monitor' testbench component may be represented as 'error': '0'. This means that no error message has been flagged by the 'Interface X Monitor' till now during the progress of the functional simulation. In addition, the connectional flow associated the 'Interface X Monitor' may include monitoring of '150' packets driven by the 'Interface X Driver'. Upon monitoring, the 'Interface X Monitor' may send the '150 packets monitored' to the 'scoreboard-1'. In some embodiments, the status information associated with the 'Interface X Monitor' testbench component may also be represented based on the appropriate view configuration selected by the user. This has been represented and explained in reference to FIG. 7.

Further, for the 'scoreboard-1' testbench component, the plurality of packets processed by the scoreboard-1 may be depicted as 'Interface A-12 packets checked', 'Interface B-108 packets checked', and 'Interface C-35 packets checked'. It should be noted that, a scoreboard (i.e., the scoreboard-1) is generally configured to receive, the plurality of packets processed by the testbench components associated with the input and output interfaces of a DUT. In this case, the testbench components associated with the output interfaces of the DUT 602 may correspond to the 'Interface A Monitor', 'Interface B Monitor', and 'Interface C Monitor'. In addition, the testbench components associated with the input interfaces of the DUT 602 may correspond to the 'Interface X Monitor' and the 'Interface Y Monitor'.

Once the plurality of packets processed by the 'Interface A Monitor', 'Interface B Monitor', and 'Interface C Monitor' is received, the scoreboard-1 may check each of the plurality of packets received to verify functionality of the DUT 602. Further, the error message flagged by the 'scoreboard-1' may be depicted as 'error: 2'. As will be appreciated, in the functional simulation, since the 'scoreboard-1' is a verification component that contains checker and verifies functionality of the DUT 602, hence the 'scoreboard-1' may represent a final output that allows the user to check if the DUT 602 is functioning correctly or not.

As depicted via the GUI 600, the connectional flow associated with the 'scoreboard-1' may include reception of the plurality of packets processed by the 'Interface X Monitor', the 'Interface Y Monitor', the 'Interface A Monitor', the 'Interface B Monitor', and the 'Interface C Monitor'. As depicted via the GUI 600, the connectional flow between each of the plurality of testbench components may be depicted via an arrow with a pointing head for pointing flow of data (i.e., the plurality of packets) between each of the plurality of testbench components.

In a similar manner, the set of information associated with other testbench components, i.e., the 'Interface X Driver', the 'Interface X Monitor', the 'Interface Y Monitor', the 'Interface Y Driver', the 'Interface A Monitor', the 'Interface B Monitor', the 'Interface C Monitor' and the 'scoreboard-1' that are present in the test environment may be represented in different blocks in the real-time test environment activity view as depicted via the GUI 600. Further, apart from the representation of the set of information associated with each of the plurality of testbench components, the real-time test environment activity view rendered on the GUI 600 may also provide representation of the set of ancillary information to the user. In an embodiment, the set of ancillary information may include, but is not limited to, the wall clock time, the date, the functional simulation timestamp, and the phase of the functional simulation. As depicted via the GUI 600, the set of ancillary information may be represented, such as, the wall clock time as 'wall clock time: 8 AM', the date as 'Sep. 8, 2021', the functional simulation timestamp as 'Sim timestamp: 150 us', and the phase of the functional simulation as "phase: run phase'.

Figure 7:
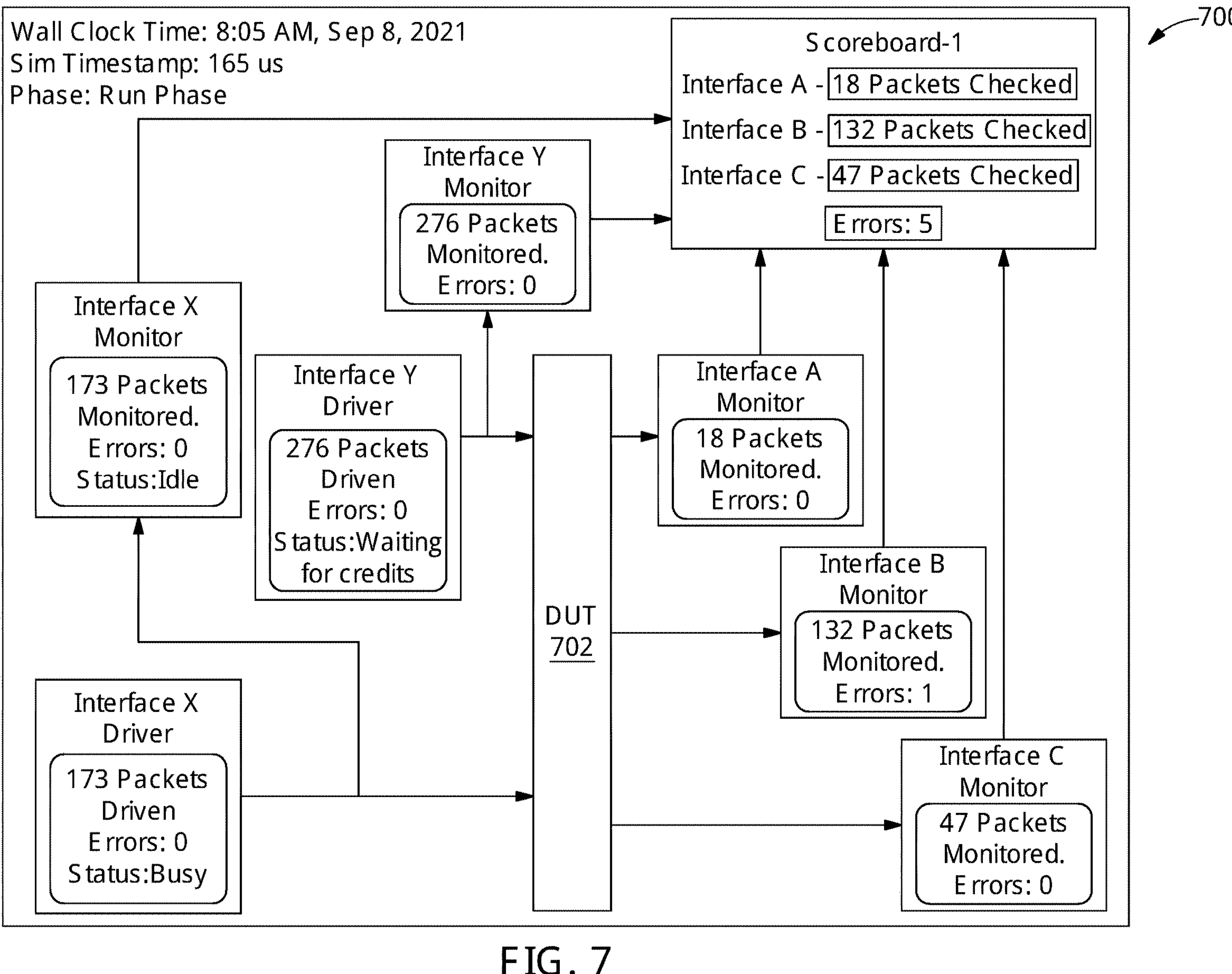
FIG. 7 depicts another representation of a real-time test environment activity view generated on a GUI based on a set of information corresponding to an activity associated with a plurality of testbench components, in accordance with an exemplary embodiment.

Referring now to FIG. 7, another representation of a real-time test environment activity view generated on a GUI 700 based on a set of information corresponding to an activity associated with a plurality of testbench components is depicted, in accordance with an exemplary embodiment. In reference to FIG. 6, the real-time test environment activity view generated on the GUI 700 may be updated representations of the real-time test environment activity view rendered on the GUI 600. In other words, the GUI 700 may correspond to the GUI 600 that is periodically updated based on the updates in the real-time test environment activity viewer log file as the functional simulation progresses. Further, the plurality of testbench components depicted in the GUI 700 may correspond to the plurality of testbench components depicted in the GUI 600.

As depicted via the GUI 700, based on progress of the functional simulation, the set of information associated with each of the plurality of testbench components, i.e., include 'Interface X Monitor', 'Interface X Driver', 'Interface Y Monitor', 'Interface Y Driver', 'scoreboard-1', 'Interface A Monitor', 'Interface B Monitor', and 'Interface C Monitor' may be updated. By way of an example, as depicted in the GUI 700, the plurality of packets processed by the 'Interface X Driver' testbench component may be updated from '150 packets driven' to '173 packets driven'. Further, the error message flagged by the 'Interface X Driver' depicted in the GUI 700, i.e., 'error: 0' may remain same as the error message flagged by the 'Interface X Driver' depicted in the GUI 600, i.e., 'error: 0'. This is because no error message has been flagged by the 'Interface X Driver' until now as the functional simulation has progressed. In addition, the status information associated with the 'Interface X Driver' may be depicted as 'busy', denoting that the 'Interface X Driver' is busy in processing of one or more packets. Further, the connectional flow of 'Interface X Driver' as depicted via the real-time test environment activity view 700 may including sending of the plurality of packets to a DUT 702 (same as the DUT 602) and the 'Interface X Monitor' testbench component.

Similarly, in the GUI 700, the plurality of packets processed by the 'Interface X Monitor' testbench component may be updated from the '150 packets monitored' to '173 packets monitored'. Further, the error message flagged by the 'Interface X Monitor' may remain '0', since no error has been flagged by the 'Interface X Monitor'. The status information associated with the 'Interface X Monitor' may be depicted as 'idle', denoting that the 'Interface X Monitor' has not performed any activity for a bit. Further, the connectional flow of the 'Interface X Monitor' may be same as explained in reference to the FIG. 6.

In a similar manner, the updated set of information associated with other simulation component, i.e., the 'Interface Y Monitor', the 'Interface Y Driver', the 'scoreboard-1', 'Interface A Monitor', 'Interface B Monitor', and 'Interface C Monitor' that are present in the test environment may be represented in the real-time test environment activity view rendered on the GUI 700. Further, the GUI 700 may also provide representation of the updated set of ancillary information to the user. The updated set of ancillary information may be represented, such as, the wall clock time as 'wall clock time: 8:05 AM', the date as 'Sep. 8, 2021', the functional simulation timestamp as 'Sim timestamp: 165 us', and the phase of the functional simulation as "phase: run phase'. It should be noted that, since the real-time test environment activity view rendered on the GUI 700 is updated in 5 minutes, there is no change in the date. In addition, since the functional simulation is still in progress, the phase of the functional simulation is depicted as 'run phase'.

Figure 8:
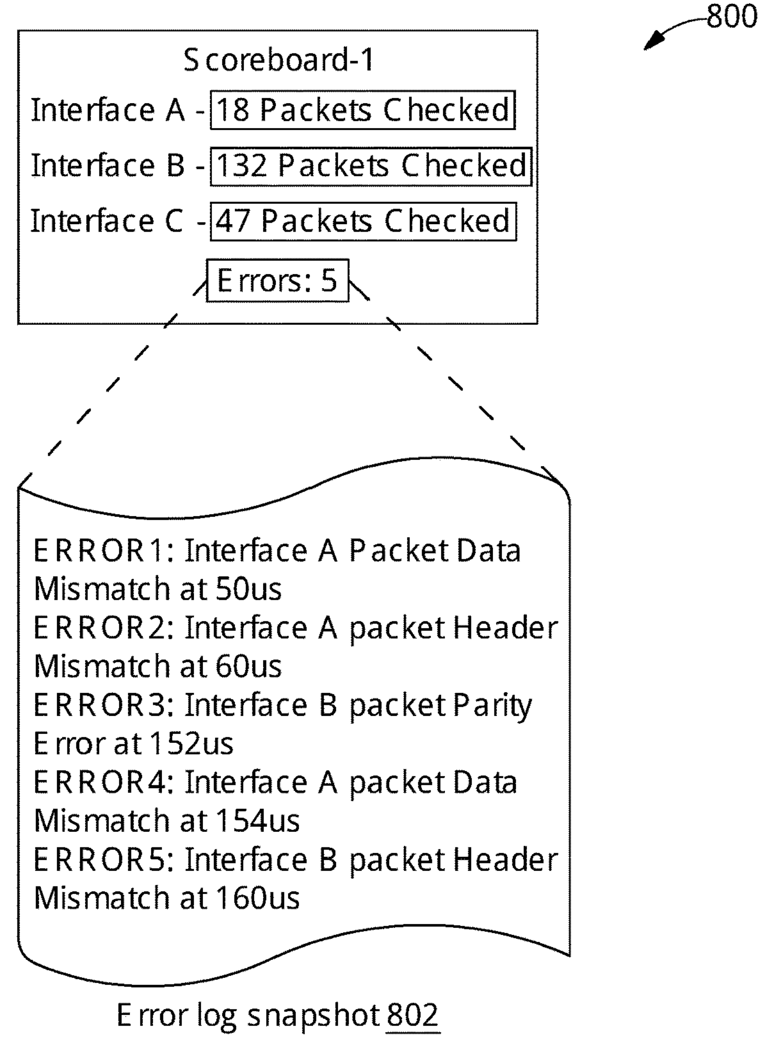
FIG. 8-FIG. 9 represents GUIs depicting an error log snapshot corresponding to two testbench components from a plurality of testbench components, in accordance with an exemplary embodiment.
Figure 9:
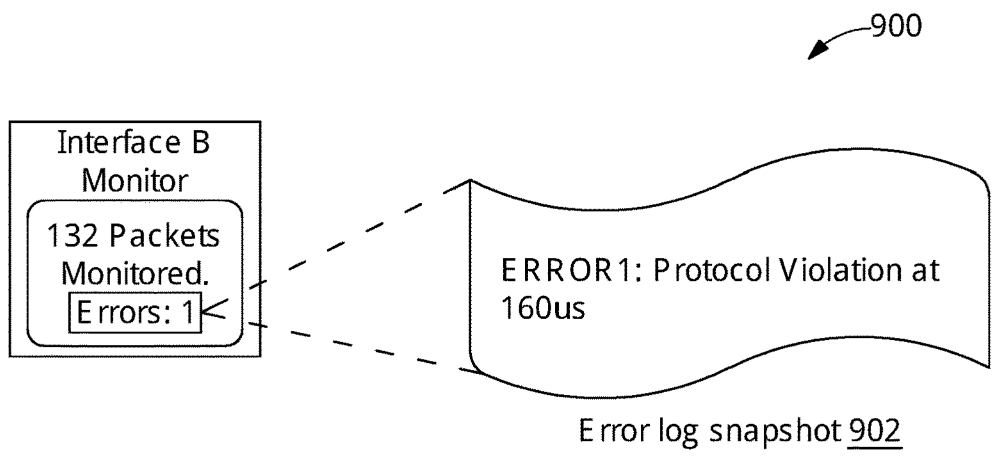

Referring now to FIG. 8 and FIG. 9, GUIs depicting an error log snapshot corresponding to two testbench components from a plurality of testbench components is represented, in accordance with an exemplary embodiment. As will be appreciated FIG. 8 and FIG. 9 are explained in reference to the real-time test environment activity view generated on the GUI 700 of the FIG. 7. In FIG. 8, a GUI depicting an error log snapshot 802 may be rendered to the user. The error log snapshot 802 may be rendered upon receiving a user action for selection of the error message flagged by the 'scoreboard-1' testbench component, i.e., 'error: 5'. By way of an example, in order to select the 'error: 5' the user may click on the 'error: 5' (for example: a mouse click or a finger click). Upon receiving the user action, the error log snapshot 802 depicting information associated with each of a set of five errors flagged by the 'scoreboard-1' testbench component may be rendered to the user. Further, in FIG. 9, a GUI depicting an error log snapshot 902 may be rendered to the user. The error log snapshot 902 rendered to the user may be associated with the error message flagged by the 'Interface B Monitor' testbench component, i.e., 'error: 1'. In an embodiment, the error log snapshot 902 may be rendered to the user, upon receiving a user action of selection of the 'error: 1', from the user.

Figure 10:
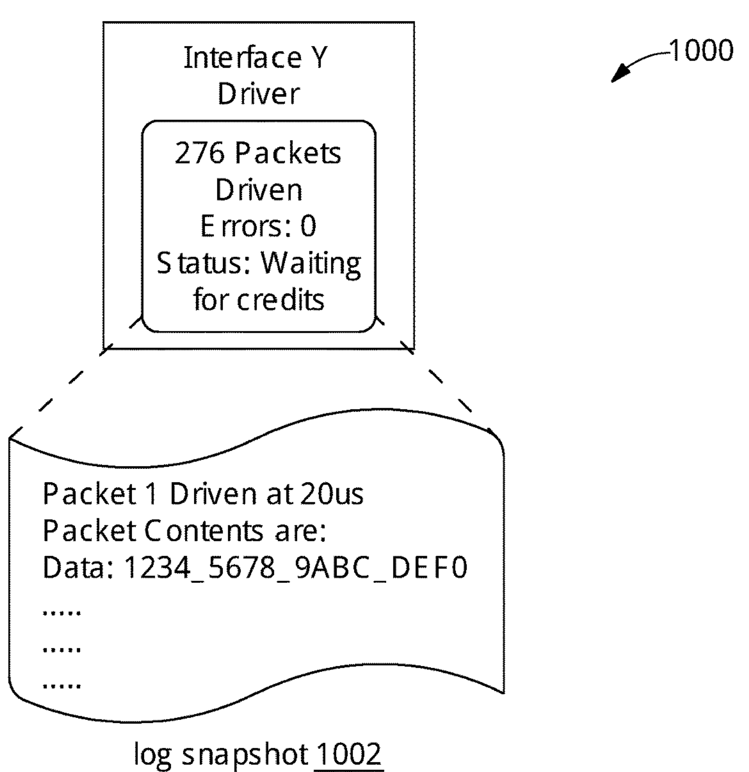
FIG. 10-FIG. 11 represents GUIs depicting a log snapshot corresponding to two testbench components from a plurality of testbench components, in accordance with an exemplary embodiment.
Figure 11:
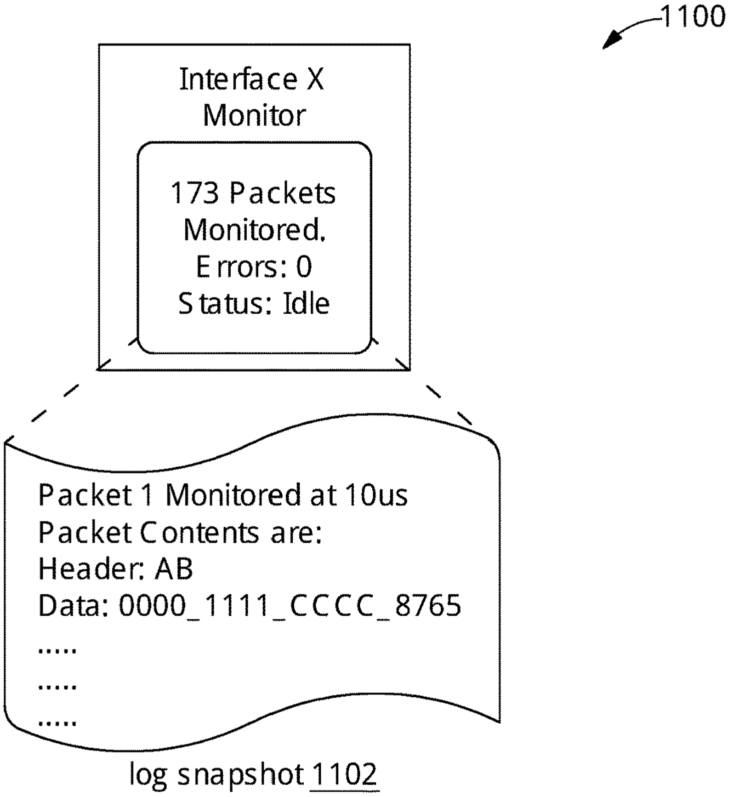

Referring now to FIG. 10 and FIG. 11, GUIs depicting a log snapshot corresponding to two testbench components from a plurality of testbench components is represented, in accordance with an exemplary embodiment. As will be appreciated FIG. 10 and FIG. 11 are explained with reference to the real-time test environment activity view generated on the GUI 700 of the FIG. 7. In FIG. 10, a GUI depicting a log snapshot 1002 may be rendered to the user. In an embodiment, the log snapshot 1002 may be rendered upon receiving a user action associated with the real-time test environment activity view rendered on the GUI 700 for a testbench component from the plurality of testbench components. As will be appreciated, the user action may include selection of the testbench component from the plurality of testbench components. By way of an example, in order to render the log snapshot 1002, the user may need to select a testbench component, i.e., the 'Interface Y Driver', from the plurality of testbench components present in the test environment as represented via the GUI 700 of FIG. 7.

In present embodiment, the user action may include selection of the 'Interface Y Driver' via a click (for example: a mouse click, or a finger click). Upon receiving the user action, the log snapshot 1002 depicting information associated with the 'Interface Y Driver' may be rendered to the user. In an embodiment, the log snapshot 1002 may include information of each of the plurality of packets processed by the 'Interface Y Driver' and information associated with any error message flagged by the 'Interface Y Driver'. Further, in FIG. 11, a GUI depicting a log snapshot 1102 associated with a testbench component, i.e., the 'Interface X Monitor' may be rendered to the user. The log snapshot 1102 may be rendered upon receiving the user action corresponding to the 'Interface X Monitor' testbench component from the plurality of testbench components present in the real-time test environment activity view rendered on the GUI 700.

Various embodiments provide method and system for generating a real-time test environment activity view for a functional simulation. The disclosed method and system may retrieve a unique identifier (ID) associated with each of a plurality of testbench components present in a test environment. The unique ID associated with each of the plurality of testbench components may be transmitted by corresponding testbench component and prestored in a real-time test environment activity viewer log file stored in a simulation logs database. Further, the disclosed method and system may iteratively fetch from the real-time test environment activity viewer log file, a set of information corresponding to an activity associated with each of the plurality of testbench components based on the associated unique ID retrieved from the real-time test environment activity viewer log file stored in the simulation logs database. Further, the disclosed method and system may contemporaneously generate at each iteration, a real-time test environment activity view for each of the plurality of testbench components based on the associated set of information. The real-time test environment activity view may correspond to progress or status of the functional simulation. Thereafter, the disclosed method and system may contemporaneously render at each iteration, the real-time test environment activity view for each of the plurality of testbench components via a Graphical User Interface (GUI).

The disclosed method and system may provide some advantages like, the disclosed method and the system may be methodology independent and hence may be used across any of an existing industry standard verification methodology. Further, the disclosed method and the system may provide pictorial representation of activities of a plurality of testbench components present in a test environment in a form of a real-time test environment activity view, for a functional simulation. In addition, the disclosed method and the system may provide representation of a dynamic view of the activities of each of the plurality of testbench components while the functional simulation is in progress. Moreover, the disclosed method and the system may provide representation of a cumulative view of the activities of each of the plurality of testbench components after the functional simulation is complete. Furthermore, the disclosed method and the system may provide user an ability to customize the real-time test environment activity view based on his preferences.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for generating a real-time test environment activity view for a functional simulation, the method comprising:

retrieving, by a real-time test environment activity view generator, a unique identifier (ID) associated with each of a plurality of testbench components present in a test environment, wherein the unique ID associated with each of the plurality of testbench components is transmitted by corresponding testbench component and pre-stored in a real-time test environment activity viewer log file stored in a simulation logs database;

periodically updating, by each of the plurality of testbench components, the real-time test environment activity viewer log file at each predefined event as the functional simulation progresses;

iteratively transmitting, during progress of the functional simulation, real-time information corresponding to each of the plurality of testbench components to the real-time test environment activity viewer log file;

iteratively fetching, during the progress of the functional simulation, from the real-time test environment activity viewer log file, by the real-time test environment activity view generator, a set of information corresponding to an activity associated with each of the plurality of testbench components based on the associated unique ID retrieved from the real-time test environment activity viewer log file stored in the simulation logs database;

contemporaneously generating at each iteration, by the real-time test environment activity view generator, the real-time test environment activity view of the functional simulation for each of the plurality of testbench components based on the associated set of information, wherein the real-time test environment activity view corresponds to progress or status of the functional simulation is a dynamic view and is updated based on the progress of the functional simulation;

receiving, by the real-time test environment activity view generator, a set of ancillary information associated with the functional simulation, wherein the set of ancillary information comprises a wall clock time, a date, a functional simulation timestamp, and a phase of the functional simulation, wherein the phase of the functional simulation is one of a Verification Methodology phase;

rendering, by the real-time test environment activity view generator, each of the set of ancillary information in the real-time test environment activity view;

periodically updating, by the real-time test environment activity view generator, each of the set of ancillary information based on the progress of the functional simulation;

contemporaneously rendering at each iteration, by the real-time test environment activity view generator, the real-time test environment activity view of the functional simulation for each of the plurality of testbench components via a Graphical User Interface (GUI);

receiving, via the GUI, a user action associated with the real-time test environment activity view for a testbench component from the plurality of testbench components; and rendering to a user, via the GUI, a log snapshot from the simulation logs database, wherein the log snapshot comprises information about a plurality of packets processed by the testbench component and information associated with any error message flagged by the testbench component.

2. The method of claim 1, wherein the plurality of testbench components comprises an agent, a sequencer, a driver, a monitor, a scoreboard, a checker, and a coverage collector, and wherein the unique ID is defined based on a function of each of the plurality of testbench components.

3. The method of claim 1, wherein the set of information comprises a plurality of packets processed by each of the plurality of testbench components, an error message flagged by one or more of the plurality of testbench components, a status information of each of the plurality of testbench components, and a connectional flow between each of the plurality of testbench components.

4. The method of claim 1, wherein the generating and the rendering of the real-time test environment activity view on the GUI comprises: plotting the set of information corresponding to each of the plurality of testbench components in the real-time test environment activity view.

5. The method of claim 1, further comprising:

periodically updating the real-time test environment activity view corresponding to each of the plurality of testbench components based on the updates in the real-time test environment activity viewer log file.

6. The method of claim 1, further comprising:

representing via the GUI to the user, a cumulative real-time test environment activity view generated after completion of the functional simulation.

7. The method of claim 1, further comprising:

customizing, by the user via the real-time test environment activity view generator, the real-time test environment activity view by selecting an appropriate pre-defined view configuration based on requirement of the user.

8. A system for generating a real-time test environment activity view for a functional simulation, the system comprising:

a processor; and a memory coupled to the processor, wherein the memory stores processor-executable instructions, which, on execution, cause the processor to:

retrieve a unique identifier (ID) associated with each of a plurality of testbench components present in a test environment, wherein the unique ID associated with each of the plurality of testbench components is transmitted by corresponding testbench component and pre-stored in a real-time test environment activity viewer log file stored in a simulation logs database;

periodically update, by each of the plurality of testbench components, the real-time test environment activity viewer log file at each predefined event as the functional simulation progresses;

iteratively transmit, during progress of the functional simulation, real-time information corresponding to each of the plurality of testbench components to the real-time test environment activity viewer log file;

iteratively fetch, during the progress of the functional simulation, from the real-time test environment activity viewer log file, a set of information corresponding to an activity associated with each of the plurality of testbench components based on the associated unique ID retrieved from the real-time test environment activity viewer log file stored in the simulation logs database;

contemporaneously generate at each iteration the real-time test environment activity view of the functional simulation for each of the plurality of testbench components based on the associated set of information, wherein the real-time test environment activity view corresponds to progress or status of the functional simulation is a dynamic view and is updated based on the progress of the functional simulation;

receive, by a real-time test environment activity view generator, a set of ancillary information associated with the functional simulation, wherein the set of ancillary information comprises a wall clock time, a date, a functional simulation timestamp, and a phase of the functional simulation, wherein the phase of the functional simulation is one of a Verification Methodology phase;

render, by the real-time test environment activity view generator, each of the set of ancillary information in the real-time test environment activity view;

periodically update, by the real-time test environment activity view generator, each of the set of ancillary information based on the progress of the functional simulation;

contemporaneously render at each iteration the real-time test environment activity view of the functional simulation for each of the plurality of testbench components via a Graphical User Interface (GUI);

receive, via the GUI, a user action associated with the real-time test environment activity view for a testbench component from the plurality of testbench components; and render to a user, via the GUI, a log snapshot from the simulation logs database, wherein the log snapshot comprises information about a plurality of packets processed by the testbench component and information associated with any error message flagged by the testbench component.

9. The system of claim 8, wherein the plurality of testbench components comprises an agent, a sequencer, a driver, a monitor, a scoreboard, a checker, and a coverage collector, and wherein the unique ID is defined based on a function of each of the plurality of testbench components.

10. The system of claim 8, wherein the set of information comprises a plurality of packets processed by each of the plurality of testbench components, an error message flagged by one or more of the plurality of testbench components, a status information of each of the plurality of testbench components, and a connectional flow between each of the plurality of testbench components.

11. The system of claim 8, wherein, to generate and render the real-time test environment activity view on the GUI, the processor-executable instructions further cause the processor to: plot the set of information corresponding to each of the plurality of testbench components in the real-time test environment activity view.

12. The system of claim 8, wherein the processor-executable instructions further cause the processor to:

periodically update the real-time test environment activity view corresponding to each of the plurality of testbench components based on the updates in the real-time test environment activity viewer log file.

13. The system of claim 8, wherein the processor-executable instructions further cause the processor to:

represent via the GUI to the user, a cumulative real-time test environment activity view generated after the completion of the functional simulation.

14. The system of claim 8, wherein the processor-executable instructions further cause the processor to:

customize, by the user, the real-time test environment activity view by selecting an appropriate predefined view configuration based on requirement of the user.

* * * * *